April 5, 1955     D. P. BRESEE     2,705,699

PACKED COLUMN AND CONTROL SYSTEM THEREFOR

Filed July 31, 1950

INVENTOR.
D. P. BRESEE

BY *Hudson & Young*
ATTORNEYS

United States Patent Office 2,705,699
Patented Apr. 5, 1955

2,705,699

PACKED COLUMN AND CONTROL SYSTEM THEREFOR

Dick P. Bresee, Bartlesville, Okla., assignor to Phillips Petroleum Company, a corporation of Delaware Application July 31, 1950, Serial No. 176,805

13 Claims. (Cl. 202—160)

This invention relates to packed columns. In one specific aspect, it relates to a control system for a packed column. In another specific aspect, it relates to a control system for a process in which a packed column is utilized.

Heretofore, considerable difficulty has been experienced in the commercial operation of packed columns due to flooding thereof. In such columns, an upright elongated vessel, usually cylindrical, is substantially filled with a packing material, such as Raschig rings, Berl saddles, and the like. A liquid and vapor are introduced so that they flow countercurrently therewithin, intimate contacting between the liquid and vapor being effected by the formation of liquid films upon the packing material which present a large surface for contact with the ascending vapors. In such columns, if the gas and liquid throughput becomes too great, the column ceases to operate satisfactorily as a countercurrent contacting device. When this occurs, the liquid is entrained by the gas and sprayed violently back from the top of the column. In some cases, the column may be substantially or entirely filled with liquid so that the desired contact between a liquid film and vapors is not attained. This condition is referred to in the art as flooding.

In accordance with this invention I provide, at a predetermined location in the column, a restricted section at which flooding occurs before it occurs at any other region of the column. By this, I mean that the flow of vapors through the column is restricted, although no particular type of physical restriction is to be taken as limiting the invention. Flooding at this restricted section is an indication of incipient flooding of the whole column and enables the operation to be controlled, either manually or automatically, so as to prevent flooding of the entire column.

It is an object of this invention to provide a packed column of new and improved construction.

It is a further object to provide an improved control system for regulating a packed column or for controlling a process involving the use of a packed column.

It is a still further object to provide apparatus which is of simple construction, reliable in operation, and economical to build, construct and maintain.

Various other objects, advantages and features of the invention will become apparent from the following detailed description taken in conjunction with the accompanying drawings, in which.

Figure 1:
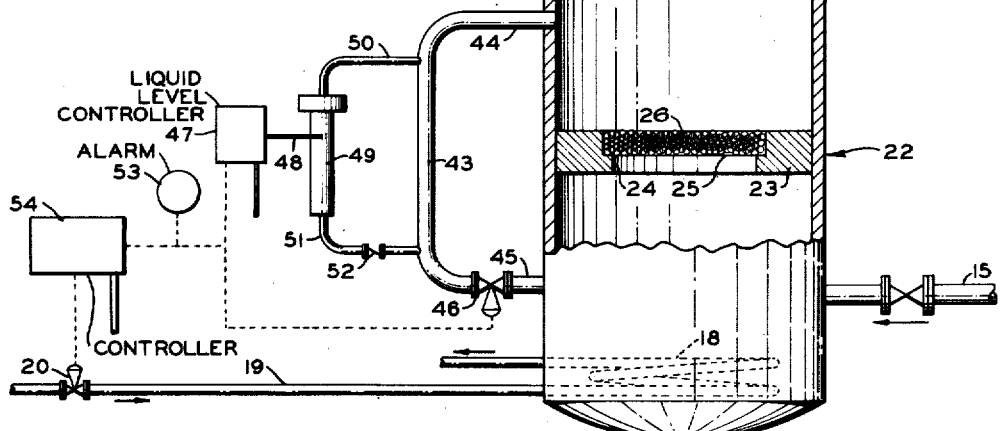
Figure 1 is a view of a packed column embodying the control system of this invention.

Referring now to Figure 1, I have shown a packed column, which can be employed, for example, in fractional distillation processes, defined by an upright elongated vessel 10 of generally cylindrical configuration, this column being provided with a retaining plate 11 carrying packing material 12 such as Raschig rings or Berl saddles. Liquid is admitted to the column by a valved conduit 13 and withdrawn by a valved conduit 14 while vapor is admitted by a valved conduit 15 and withdrawn by a valved conduit 16. It will be evident, therefore, that the liquid passes downwardly through the packing material 12 and is countercurrently contacted by an upwardly directed vapor stream. The heat supplied at the bottom of the column can be regulated by a steam coil 18 fed by a conduit 19 which is controlled by an automatic valve 20 while the heat withdrawn from the top of the column can be regulated by control of the reflux rate. It will be noted that any process variable, such as the heat input or withdrawal rate, the feed rate or withdrawal rate of the vapor or liquid can be regulated, as by the valves shown, to inhibit flooding of the column. For example, a tendency toward flooding can be inhibited by decreasing the heat supplied at the bottom of the column and thereby decreasing the vapor velocity.

In accordance with the invention, I provide a structure at a predetermined location in the column which effects a greater restriction of the passage of liquids and vapors therethrough than does the packing at any other region of the column. I have discovered that, when this is done, this restricted section is flooded before any flooding occurs in the rest of the column. However, when flooding of the restricted section occurs, conditions are such that flooding of the rest of the column is imminent if corrective measures are not taken by suitable regulation of a process variable.

In Figure 1, the restricted section is disposed at a predetermined location 22 in the column, the structure forming the restriction including a ring 23 having an inwardly directed flanged portion 24 at the lower end thereof, this flange supporting a retainer 25 carrying packing material 26 which is conveniently of the same dimensions and character as the packing material 12. The ring 23, in effect, substantially reduces the diameter of the tower at the location 22 with the result that flooding occurs at this location before it occurs at any other part of the tower, the flooding at location 22 being indicative of the fact that the rest of the column is in a condition of incipient flooding.

Figure 2:
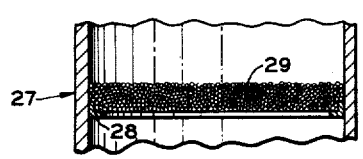
Figures 2 and 3 are vertical sectional views of modified restricting devices.

In the modification of Figure 2, a restriction is provided at a predetermined location 27, the structure including a retaining ring 28 supporting a quantity of packing material or matter 29 which is of considerably smaller dimensions than the packing material 12. Accordingly, the packing matter 29 restricts the flow of vapors and liquids therethrough to a considerably greater extent than does the packing material 12. As a result, flooding occurs at location 27 before it occurs at any other part of the column for the reasons noted in connection with Figure 1.

Figure 3:
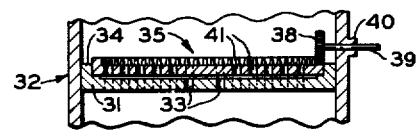
Figure 4:
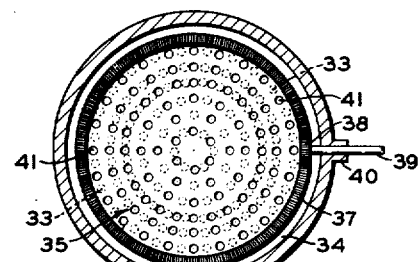
Figure 4 is a top view of the restricting device of Figure 3.

In still another embodiment illustrated in Figures 3 and 4 the structure for restricting the flow of vapors and liquids through the column includes a perforated plate 31 disposed within the column at a preselected location 32, the perforations 33 in the plate being arranged, in the example shown, in several rows extending radially outward from the center of the plate. Upstanding from the plate 31 is a circumferential flange 34 within which is mounted a second perforated plate 35. The plate 35 may either rest upon plate 33 or, alternatively, a circumferential bearing race, not shown, may be provided to facilitate relative rotation between these parts. The plate 35 is further provided with a circumferential upstanding gear 37 meshing with a pinion 38, the pinion being fixed upon a shaft 39 which extends through a suitable bearing 40 in the wall of vessel 10. It will be noted that the plate 35 is provided with perforations 41 which are arranged in a generally similar manner to the perforations 33 in plate 31. That is, the perforations 41 are arranged in rows extending radially outward from the center of the plate.

The number, size and spacing of the openings 33 and 41 are so chosen that a restricted passage is formed within the packed column which offers greater resistance to the passage of liquid and vapor than does the packing material 12. As a result, flooding occurs at location 32 before it occurs at any other location within the column and such flooding at the location 32 is indicative of incipient flooding at other sections of the column. The structure shown in Figure 3 has the advantage that the restrictive effect may be varied by suitable rotation of plate 35 relative to plate 31. With the parts in the position shown in Figure 4, the openings 41 do not register with the openings 33 and, as a result, passage of liquid and vapor through the column is substantially prevented. Evidently, plate 35 can be rotated by pinion 38 to cause a partial or complete overlapping of the openings 33 and 41, thus permitting a greater or less restriction to be imposed upon the gases and vapors at the preselected location 32.

In accordance with the invention, suitable control apparatus is associated with the preselected location at which flooding occurs, this apparatus permitting such flooding to be detected and suitable preventive measures to be taken either manually or automatically to prevent flooding of the entire column. To this end, I provide a conduit 43, the upper end 44 of which communicates with the interior of the vessel a short distance above a preselected location 22, 27 or 32, the bottom portion 45 of the conduit communicating with the interior of the column below such preselected location. An automatic valve 46 is positioned in the lower portion 45 of the conduit, this valve being actuated by a liquid-level controller 47 comprising a float arm 48 extending into an upright cylindrical tube 49, the top of which communicates through a line 50 with the upper part of conduit 43 and the bottom end of which communicates through a line 51 and a check valve 52 of novel construction with the lower part of conduit 43. Liquid-level controller 47 also actuates an alarm or indicator 53 and a valve control unit 54 which regulates a process variable, for example, the amount of steam supplied to reboiler coil 18, so as to correct an incipient flooding condition detected by the sensing unit including conduit 43 and liquid-level control unit 47 and 49.

Figure 5:
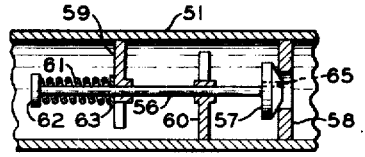
Figure 5 is a vertical sectional view of a check valve of novel construction utilized in this invention.

The construction of check valve 52, as shown by Figure 5, includes a plunger 56 carrying a valve head 57 which is engageable with an annular valve seat 58 positioned in conduit 51. The plunger 56 is supported for longitudinal movement by spiders 59, 60. A tension spring 61 is mounted between a spacer 62 on the plunger and a spacer 63 carried by spider 59, this spring normally urging the valve head into engagement with the valve seat. It is a feature of the valve of Figure 5 that a small bleed passage 65 is provided in the valve head 57 to allow passage of a small liquid stream from pipe 51 into conduit 43 although, of course, the normal action of the valve is to permit flow of liquid only in the opposite direction. With the valve connected, as shown, it will be evident that, as liquid rises in conduit 43, it passes through valve 52 into pipe 51 and liquid-level control unit 49. When liquid is discharged from conduit 43, the liquid remaining in unit 49 is discharged slowly through the opening 65 and, thence, into the conduit 43.

The overall operation of the control system will now be apparent to those skilled in the art. Assuming that the tower 10 reaches a condition of incipient flooding, a liquid level appears above the restriction in the column defined by the structures shown in Figures 1, 2 or 3. Valve 46 is normally closed and, when the liquid level rises up to conduit portion 44, the conduit 43 is filled with liquid and a portion of this liquid passes through valve 52 and pipe 51 into liquid level control unit 49, thereby moving float arm 48 upwardly and actuating controller 47. Thereupon, alarm 53 is energized, valve 46 is opened and a control impulse is supplied to unit 54 to actuate valve 20 and correct the incipient flooding condition. In the example shown, valve 20 reduces the supply of steam to the reboiler coil 18, thus reducing the vapor pressure and tending to alleviate the incipient flooding condition.

It will be understood, of course, that controller 54 can control any other process variable to achieve the desired result. Thus, for example, the unit may actuate any of the valves shown in Figure 1 to change the feed or withdrawal rate of the vapor or liquid or to vary the reflux rate.

When valve 46 opens responsive to actuation of controller 47, the liquid drains from conduit 43 into a portion of the column below preselected location 22. However, a portion of this liquid still remains in control unit 49 and is slowly discharged through the opening 65 in valve 52. Accordingly, controller 47 is energized for a definite period after valve 46 is opened and the liquid from conduit 43 is discharged into the lower portion of the vessel, this period terminating when sufficient liquid has passed through opening 65 to cause float arm 48 to drop a sufficient distance as to deenergize controller 47. During this period, alarm 53 continues to function and a correction impulse continues to be supplied by controller 54.

When controller 47 is deenergized in the manner described, valve 46 is again closed, alarm 53 is deenergized and controller 54 is either deenergized or permits the variable control to remain at its adjusted setting, depending upon the manner of operation of the controller. It will be understood that controllers are commercially available to perform both functions.

Assuming that the incipient flooding condition has been corrected, normal operation of the column is resumed until flooding again occurs at pre-selected location 22 to initiate a subsequent cycle of operation of the control apparatus. However, if the incipient flooding condition is not alleviated by the first operation of the control apparatus, a liquid level again builds up above the restricted location and a new cycle of operations is immediately initiated.

It will be apparent that the control apparatus of my invention offers a number of important advantages. Prompt and efficient action is taken to correct incipient flooding occurring within the column without, however, producing any danger of flooding of the entire column which would cause considerable difficulty in operation or even a lengthy shutdown. This enables the tower to be operated under conditions of maximum throughput which approach conditions of incipient flooding but do not reach them. In previous practice, it has been necessary to operate further away from conditions of incipient flooding in order to have definite assurance that no flooding would occur. It will be further noted that the control is extremely flexible to the control of operations utilizing a packed column in a variety of ways. In some cases, it is desirable to provide a similar restricted section and associated control apparatus at two or even more different locations in the column, the control apparatus causing variation of the same or different process variables.

While the invention has been described in connection with present, preferred embodiments thereof, it is to be understood that this description is illustrative only and is not intended to limit the invention, the scope of which is defined by the appended claims.

I claim:

1. A packed column comprising an upright, elongated vessel, means for effecting the countercurrent flow of a liquid and a vapor in said vessel, packing material disposed throughout a major portion of the interior of said vessel to provide intimate contacting of said liquid and vapor, said material restricting the flow of said fluids within said vessel, and means for restricting the flow of said fluids at a predetermined location in said vessel to a greater extent than the flow is restricted by said material.

2. A packed column constructed in accordance with claim 1 in which the last-mentioned means comprises packing matter disposed in said predetermined location, said matter being of substantially smaller diameter than said packing material, whereby flooding occurs at said location prior to occurrence of flooding at any other region of said vessel.

3. A packed column constructed in accordance with claim 1 in which the last-mentioned means comprises a first perforated plate positioned horizontally within said column at said predetermined location, a second perforated plate positioned horizontally adjacent said first plate, and means for rotating said first plate with respect to said second plate to align the perforations in said first plate with the perforations in said second plate.

4. A packed column comprising an upright, elongated vessel, means for effecting countercurrent flow of a liquid and a vapor in said vessel, packing material disposed substantially throughout the interior of said vessel to provide intimate contacting of said liquid and vapor, said material restricting the flow of said fluids within said vessel, means for restricting the flow of said fluids at a predetermined location in said vessel to a greater extent than the flow is restricted by said material, and means for sensing flooding of the vessel at said predetermined location.

5. A packed column constructed in accordance with claim 5 in which said structure comprises a packing support positioned at said predetermined location, and packing matter carried by said support, said matter being of substantially smaller dimensions than said packing material, whereby flooding occurs at said predetermined location before it occurs at any other location in said vessel.

6. A packed column constructed in accordance with claim 4 in which said structure comprises a perforated plate mounted within said vessel at said predetermined location, a second perforated plate mounted within said vessel closely adjacent said first perforated plate, and means for effecting rotary movement of one of said plates to change the relationship of the perforations in said plates and thereby vary the flow restriction in said vessel at said predetermined location.

7. A control system for a packed column defined by an upright, elongated vessel having packing material disposed substantially throughout the interior thereof to provide intimate contacting of a liquid and vapor passing countercurrently therethrough, said liquid descending and said vapor ascending in said column, said material restricting the flow of said fluids within said vessel, said control system comprising means for further restricting the flow of said fluids at a predetermined location in said vessel, whereby flooding occurs at said predetermined location before it occurs at any other location within said vessel, means for sensing flooding in said predetermined location, and means responsive to said sensing means to adjust a means regulating the operation of said column so as to inhibit flooding thereof.

8. A control system for a fractional distillation process embodying a packed column, said column comprising an upright, elongated vessel, means for effecting counter-current flow of a liquid and a vapor in said vessel, packing material in said vessel arranged to provide intimate contacting of said liquid and said vapor, means for controlling heat supplied to and withdrawn from said vessel, means for controlling the rate of introduction of feed and reflux to the top of said column, means controlling the rate of product withdrawal from the bottom of said column, each of said controlling means thereby regulating an operating variable adjustable to prevent flooding of said vessel, said control system comprising means for restricting the flow of said fluids within said vessel at a predetermined location therein, means for sensing flooding at said predetermined location, and a control device responsive to said sensing means to regulate one of said controlling means to inhibit flooding of said column.

9. A control system for a fractional distillation process embodying a packed column, said column comprising an upright, elongated vessel, means for effecting counter-current flow of a liquid and a vapor in said vessel, packing material in said vessel arranged to provide intimate contacting of said liquid and said vapor, means for controlling heat supplied to and withdrawn from said vessel, means for controlling the rate of introduction of feed and reflux to the top of said column, means controlling the rate of vapor and liquid withdrawal from the bottom of said column, each of said controlling means thereby regulating an operating variable adjustable to prevent flooding of said vessel, said control system comprising means within said column to restrict the flow of fluids therethrough at a predetermined location therein, whereby flooding occurs at said location before it occurs at any other location within said vessel, a conduit extending from a region immediately above said location to a region below said location, a normally closed valve in the lower portion of said conduit, a liquid-level indicator to detect a liquid level in said conduit, and control means actuated by said liquid-level indicator to open said valve and actuate one of said controlling means to inhibit flooding in said vessel.

10. A control system for a liquid-vapor contacting process embodying a packed column, said column comprising an upright, elongated vessel, means for effecting counter-current flow of a liquid and a vapor in said vessel, packing material in said vessel arranged to provide intimate contacting of said liquid and said vapor, means for controlling heat supplied to and withdrawn from said vessel, means for controlling the rate of introduction of vapor into a lower region of said column, means for controlling the rate of introduction of liquid into an upper region of said column, means controlling the rate of vapor withdrawal from the top of said column, means controlling the rate of liquid withdrawal from the bottom of said column, each of said controlling means thereby regulating an operating variable adjustable to prevent flooding of said vessel, said control system comprising means within said column to restrict the flow of fluids therethrough at a predetermined location therein, whereby flooding occurs at said location before it occurs at any other location within said vessel, a conduit extending from a region immediately above said location to a region below said location, a normally closed valve in the lower portion of said conduit, a liquid-level indicator to detect a liquid level in said conduit, a check valve allowing liquid to pass into said liquid-level indicator as liquid rises in said conduit, said valve allowing liquid to flow slowly in the reverse direction from said indicator to said conduit, and control means actuated by said liquid-level indicator to decrease the heat supplied to said vessel when said liquid level rises above a predetermined value to inhibit flooding in said vessel.

11. A control system for a liquid-vapor contacting process embodying a packed column, said column comprising an upright, elongated vessel, means for effecting counter-current flow of a liquid and a vapor in said vessel, packing material in said vessel arranged to provide intimate contacting of said liquid and said vapor, means for controlling heat supplied to and withdrawn from said vessel, means for controlling the rate of introduction of vapor into a lower region of said column, means for controlling the rate of introduction of liquid into an upper region of said column, means controlling the rate of vapor withdrawal from the top of said column, means controlling the rate of liquid withdrawal from the bottom of said column, each of said controlling means thereby regulating an operating variable adjustable to prevent flooding of said vessel, said control system comprising means within said column to restrict the flow of fluids therethrough at a predetermined location therein, whereby flooding occurs at said location before it occurs at any other location within said vessel, a conduit extending from a region immediately above said location to a region below said location, a normally closed valve in the lower portion of said conduit, a liquid-level indicator to detect a liquid level in said conduit, a check valve allowing liquid to pass into said liquid-level indicator as liquid rises in said conduit, said valve allowing liquid to flow slowly in the reverse direction from said indicator to said conduit, and means actuated by said liquid-level indicator.

12. A control system for a packed column defined by an upright, elongated vessel having packing material disposed substantially throughout the interior thereof to provide intimate contacting of a liquid and vapor passing countercurrently therethrough, said liquid descending and said vapor ascending in said column, said material restricting the flow of said fluids within said vessel, said control system comprising means for further restricting the flow of said fluids at a predetermined location in said vessel, whereby flooding occurs at said predetermined location before it occurs at any other location within said vessel, a conduit extending from a region immediately above said location to a region below said location, a normally closed valve in the lower portion of said conduit, a liquid-level indicator to detect a liquid level in said conduit, and control means actuated by said liquid-level indicator to open said valve when said liquid rises to a predetermined level in said conduit.

13. A control system for a liquid-vapor contacting process embodying a packed column, said column comprising an upright, elongated vessel, packing material in said vessel arranged to provide intimate contacting of liquid and vapor passed countercurrently in said vessel, means for controlling the heat supplied to said vessel, means for controlling the introduction of vapor into a lower portion of said vessel, means for controlling the introduction of liquid into an upper portion of said vessel, means for controlling the withdrawal of liquid from the bottom of said vessel, means for controlling the withdrawal of vapor from the top of said vessel, each of said controlling means thereby regulating an operating variable adjustable to prevent flooding of said vessel, said control system comprising means for restricting the flow of said fluids within said vessel at a predetermined location therein, means for sensing flooding at said predetermined location, and a control device responsive to said sensing means to regulate one of said controlling means to inhibit flooding of said column.

References Cited in the file of this patent

UNITED STATES PATENTS

| | | |
|---|---|---|
| 485,126 | Lunge | Oct. 25, 1892 |
| 573,342 | Miller | Dec. 15, 1896 |

(Other references on following page)

UNITED STATES PATENTS

| Number | Name | Date |
|---|---|---|
| 586,779 | Neumeyer et al. | July 20, 1897 |
| 1,141,266 | Roschig | June 1, 1915 |
| 1,156,800 | Miller | Oct. 12, 1915 |
| 1,367,993 | Stahl | Feb. 8, 1921 |
| 1,684,740 | Newborne | Sept. 18, 1928 |
| 1,708,685 | Taylor | Apr. 9, 1929 |
| 1,730,891 | Leslie et al. | Oct. 8, 1929 |
| 1,748,508 | Cooke | Feb. 28, 1930 |
| 1,865,400 | McConnell | June 28, 1932 |
| 2,071,429 | Rapatz | Feb. 23, 1937 |
| 2,271,671 | Wible | Feb. 3, 1942 |
| 2,281,282 | Gerhold | Apr. 28, 1942 |
| 2,388,931 | Nelson | Nov. 13, 1945 |
| 2,467,951 | Whitley | Apr. 19, 1949 |
| 2,473,737 | Storment | June 21, 1949 |
| 2,508,434 | Storment | May 23, 1950 |
| 2,534,173 | Kraft | Dec. 12, 1950 |

UNITED STATES PATENT OFFICE
CERTIFICATE OF CORRECTION

Patent No. 2,705,699

April 5, 1955

Dick P. Bresee

It is hereby certified that error appears in the printed specification of the above numbered patent requiring correction and that the said Letters Patent should read as corrected below.

Column 4, line 79, for the claim reference numeral "5" read -- 4 --.

Signed and sealed this 23rd day of August 1955.

(SEAL)
Attest:

E. J. MURRY

Attesting Officer

ROBERT C. WATSON
Commissioner of Patents